(No Model.)

D. SANGUINETTE.
DEVICE FOR SPEARING FROGS, &c.

No. 542,315. Patented July 9, 1895.

Witnesses
H. B. Wells
H. Auhl

Inventor
David Sanguinette
By his Attorneys,
Keller & Stark

UNITED STATES PATENT OFFICE.

DAVID SANGUINETTE, OF ST. LOUIS, MISSOURI.

DEVICE FOR SPEARING FROGS, &c.

SPECIFICATION forming part of Letters Patent No. 542,315, dated July 9, 1895.

Application filed October 29, 1894. Serial No. 527,166. (No model.)

*To all whom it may concern:*

Be it known that I, DAVID SANGUINETTE, of the city of St. Louis, State of Missouri, have invented certain new and useful Improvements in Frog-Spears, of which the following is a full, clear, and exact description, reference being had to the accompanying drawings, forming a part hereof.

My invention has relation to devices for spearing frogs and like animals; and it consists in the novel arrangement and combination of parts more fully set forth in the specification and pointed out in the claims.

Figure 1:
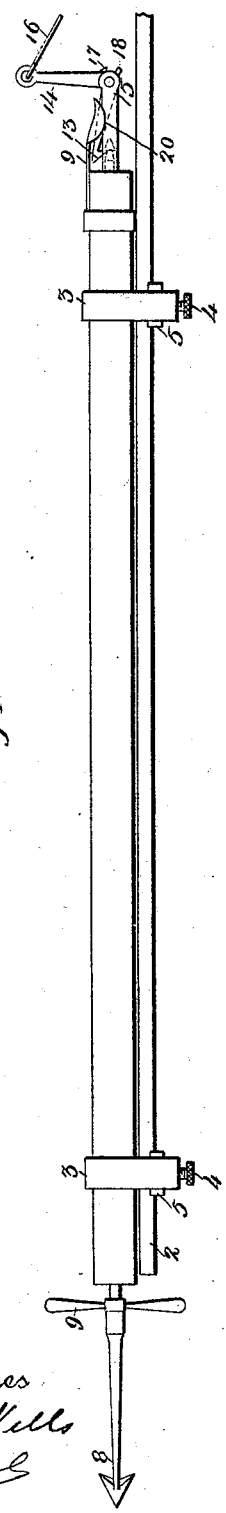
Figure 2:
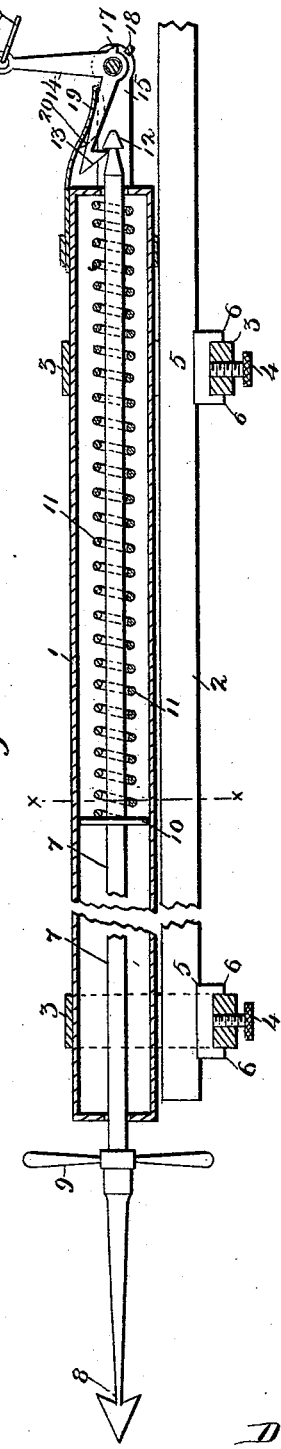
Figure 4:
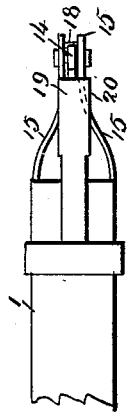
Figure 3:
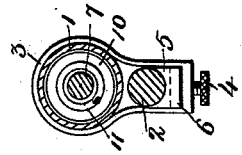

In the drawings, Figure 1 is a side elevation of my improved frog-spear. Fig. 2 is a middle vertical longitudinal section of the same. Fig. 3 is a section on the line $x$ $x$ of Fig. 2; and Fig. 4 is a detail plan view of one end of the device, showing the spring-plate which controls the tripping-lever.

The object of my invention is to construct a spear for catching frogs and like animals which will be positive in its action, be certain and accurate, and one which will be simple, durable, and easily manipulated. To this end I have devised a spear which in detail may be described as follows:

Referring to the drawings, 1 represents the casing within which the operative parts of the spear are confined. The casing is generally secured to the end of a rod 2, held in the hands of the operator, by means of straps 3, the casing and rod being firmly held by the screw-threaded bolts 4, passing through suitable openings in the straps. Suitable blocks 5 are interposed between the inner ends of the bolts 4 and the outer surface of the rod 2 to prevent the inner ends of the bolts from penetrating the outer surface of the rod. The blocks are prevented from slipping out by the retaining-lugs 6, embracing the opposite edges of the straps 3. Within the casing 1 there operates a stem 7, projecting from the casing at either end. The outer end of the stem carries a spear 8, the said stem being manipulated by the cross-arms 9, which also serve the additional function of limiting the depth to which the spear shall penetrate the body of the animal. At a suitable point along the stem and within the casing is secured to the stem a disk 10, between which and the opposite inner end of the casing and encircling the stem is interposed a coiled spring 11, being denominated as the "operating-spring." The projecting end of the stem opposite that of the spear is provided with a conical head 12, with the basal portion or surface of which is adapted to co-operate the flat surface of a toe 13 at the inner end of a bell-crank lever 14, denominated the "tripping-lever," pivoted between the ends of the projecting arms 15, carried by the casing. The free end of the tripping-lever 14 has secured thereto one end of a cord or string 16 that is controlled by the operator. Opposite the pivotal point of the lever 14 is a projecting lug 17, which in the rocking of the lever strikes the cross-bar 18, connecting the ends of the arms 15, the lever being thus limited in its rocking motion. The toe 13 of the inner end of the lever is kept in engagement with the conical end 12 by the spring-plate 19, which presses against the upper surface of the inner arm of the lever and prevents the said arm from being laterally displaced with reference to the plate by the depending lateral ears 20, (see Fig. 1,) which embrace the sides of the arm.

To operate the device, the operator by seizing the arms 9 forces the stem 7 through the casing until the conical end 12 projects out therefrom and engages with the toe 13 of the spring-controlled tripping-lever 14, the parts assuming the position as shown in Figs. 1 and 2. The stem 7 is of course guided within the casing by the disk 10, and its outward movement is limited by the same disk. The operator now pulls the cord 16, tripping the lever 14 out of engagement from the end of the stem 7, and the spring 11 thrusts the stem outwardly, bringing the spear 8 into the body of the animal.

To prevent the tilting of the lever 14 too far and thus out of engagement with the plate 19, the lug 17 comes in engagement with the cross-piece 18 at the end of the arms 15.

Having described my invention, what I claim is—

1. In a frog-spear, a suitable casing, a spring-controlled stem operating within the same, a spear at one projecting end of the stem, and means for actuating the stem from the opposite projecting end of the same, substantially as set forth.

2. In a frog-spear, a suitable casing, a spring-controlled stem operating within the same, a spear at one projecting end of the stem, and a tripping lever for actuating the stem from the opposite end of said stem, substantially as set forth.

3. In a frog-spear, a suitable casing, a spring-controlled stem operating within the same, a spear at one projecting end of the stem, a tripping lever for actuating the stem from the opposite end thereof, and means for limiting the movement of the tripping lever, substantially as set forth.

4. In a frog-spear, a suitable casing, a spring-controlled stem operating within the same, a spear at one projecting end of the stem, a tripping lever for actuating the stem from the opposite end thereof, a spring plate for controlling the tripping lever and preventing lateral displacement, and a suitable device for limiting the tilting of the tripping lever, substantially as set forth.

5. A frog-spear comprising a suitable casing, a stem operating within the same and projecting therefrom at either end, a spear carried at one end of the stem, operating arms secured to the stem adjacent to the spear, a guide disk secured to the stem within the casing, a coiled spring encircling the stem within the casing and interposed between the disk and the inner opposite end of the casing, a cone at the outer projecting end of the stem opposite to that carrying the spear, a tripping lever, a toe carried by the lever adapted to engage with the cone on said stem, arms secured to the casing to which the tripping lever is pivoted, a cross bar at the end of said arms, a lug at the pivotal portion of the tripping lever adapted to strike said cross bar, a spring plate projecting from the casing and adapted to press against the outer surface of the inner arm of the tripping lever, lateral depending ears on said spring plate embracing the sides of the said inner arm, and a suitable cord for tripping the lever, substantially as set forth.

In testimony whereof I affix my signature in the presence of two witnesses.

DAVID SANGUINETTE.

Witnesses:
EMIL STAREK,
H. A. UHL.